Figure 1:
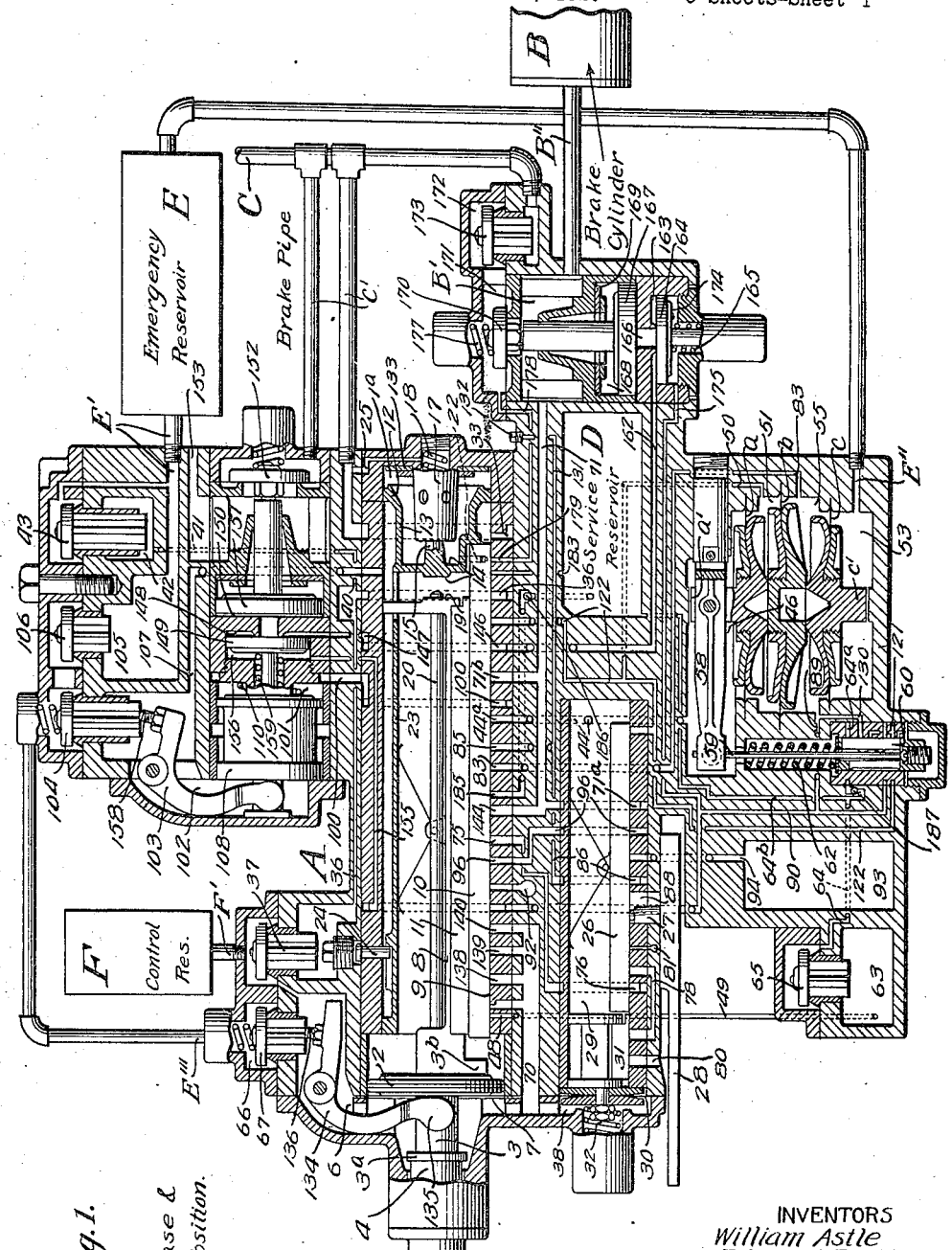

Sept. 28, 1926.

W. ASTLE ET AL 1,601,587

CONTROL VALVE FOR AIR BRAKE APPARATUS

Filed Dec. 18, 1925   5 Sheets-Sheet 1

Full Release &
Charging Position.

INVENTORS
William Astle
Edward P. Wilson
Maurice E. Hamilton
Spencer G. Neal.
BY
ATTORNEYS Sept. 28, 1926.

W. ASTLE ET AL 1,601,587

CONTROL VALVE FOR AIR BRAKE APPARATUS

Filed Dec. 18, 1925   5 Sheets-Sheet 3

INVENTORS
William Astle
Edward P. Wilson
Maurice E. Hamilton
Spencer G. Neal.
BY
ATTORNEYS Sept. 28, 1926. 1,601,587
W. ASTLE ET AL
CONTROL VALVE FOR AIR BRAKE APPARATUS
Filed Dec. 18, 1925 5 Sheets-Sheet 4

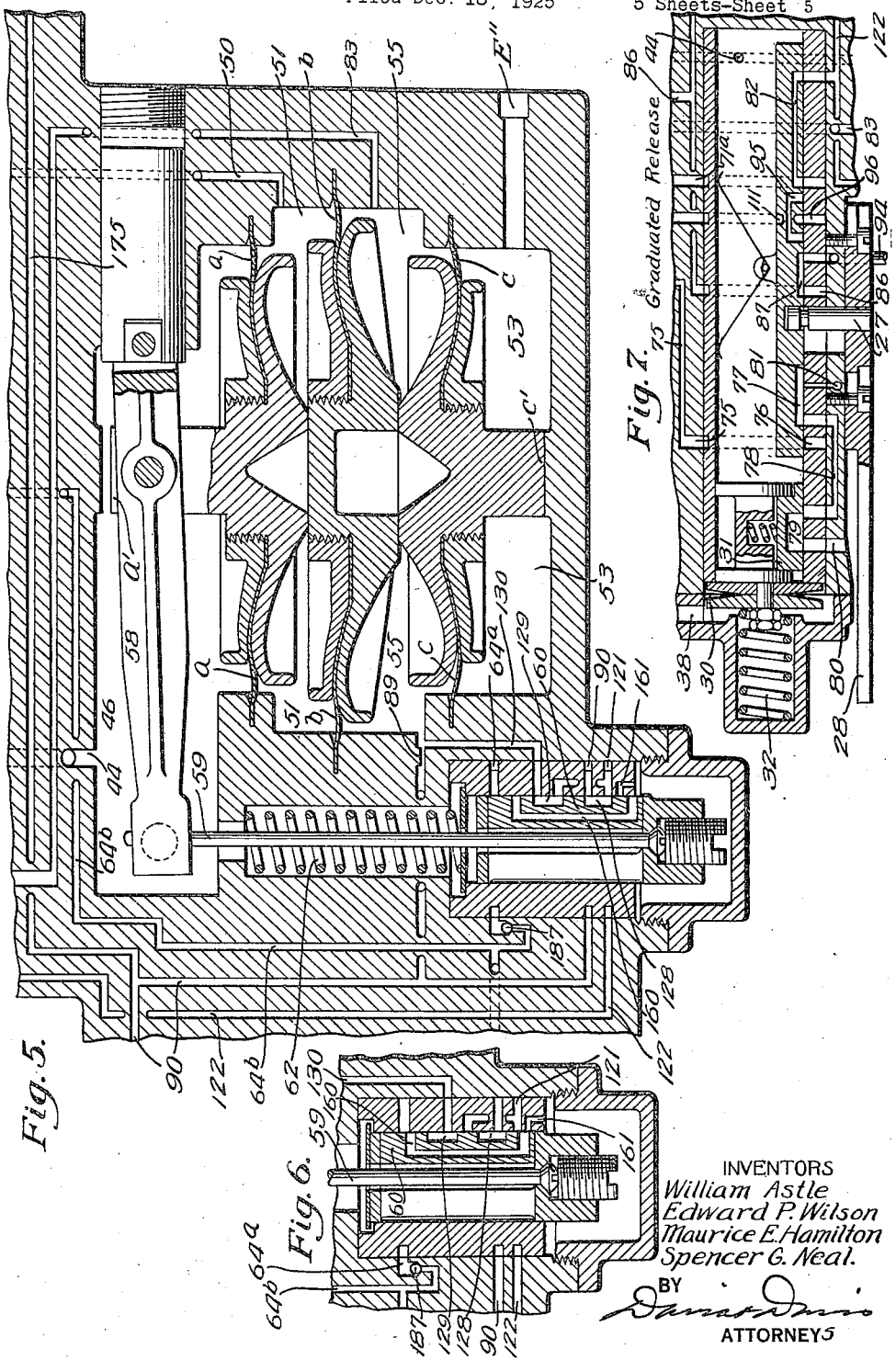

Patented Sept. 28, 1926.

1,601,587

UNITED STATES PATENT OFFICE.

WILLIAM ASTLE, OF BROOKLYN, NEW YORK, EDWARD P. WILSON, OF EAST ORANGE, NEW JERSEY, MAURICE E. HAMILTON, OF PAWTUCKET, RHODE ISLAND, AND SPENCER G. NEAL, OF NEW YORK, N. Y., ASSIGNORS TO AUTOMATIC STRAIGHT AIR BRAKE COMPANY, OF WILMINGTON, DELAWARE, A CORPORATION OF DELAWARE.

CONTROL VALVE FOR AIR-BRAKE APPARATUS.

Application filed December 18, 1925. Serial No. 76,202.

This invention relates to improvements in that type of control valves for air brake apparatus shown in application, Serial No. 68,151, filed November 10, 1925.

The main object of this invention is to provide a control valve for air brake apparatus which will not go to emergency position unless an emergency application is desired; which will not give an undesired release; and which will give increased emergency brake cylinder pressure and will be extremely rapid in service braking operations.

Another object of this invention is to provide a control reservoir to supply air under pressure for the operation of the main and supplemental slide valves to service position and to emergency position. A service reservoir is provided to supply air for service braking operations and an emergency reservoir is provided for supplying air for emergency applications of the brakes.

Another object of the invention is to provide means whereby the supplemental slide valve in service position will connect the service reservoir to the brake pipe to automatically feed air from the brake pipe into the service reservoir whenever the service reservoir pressure is below the brake pipe pressure and the supplemental slide valve is in service position.

Another object of the invention is to provide means whereby when the main slide valve is in emergency position a brake pipe air admission valve will be opened to permit air to flow from the brake pipe to the brake cylinder, a brake pipe vent valve being also opened to permit brake pipe air to flow to atmosphere.

Figure 2:
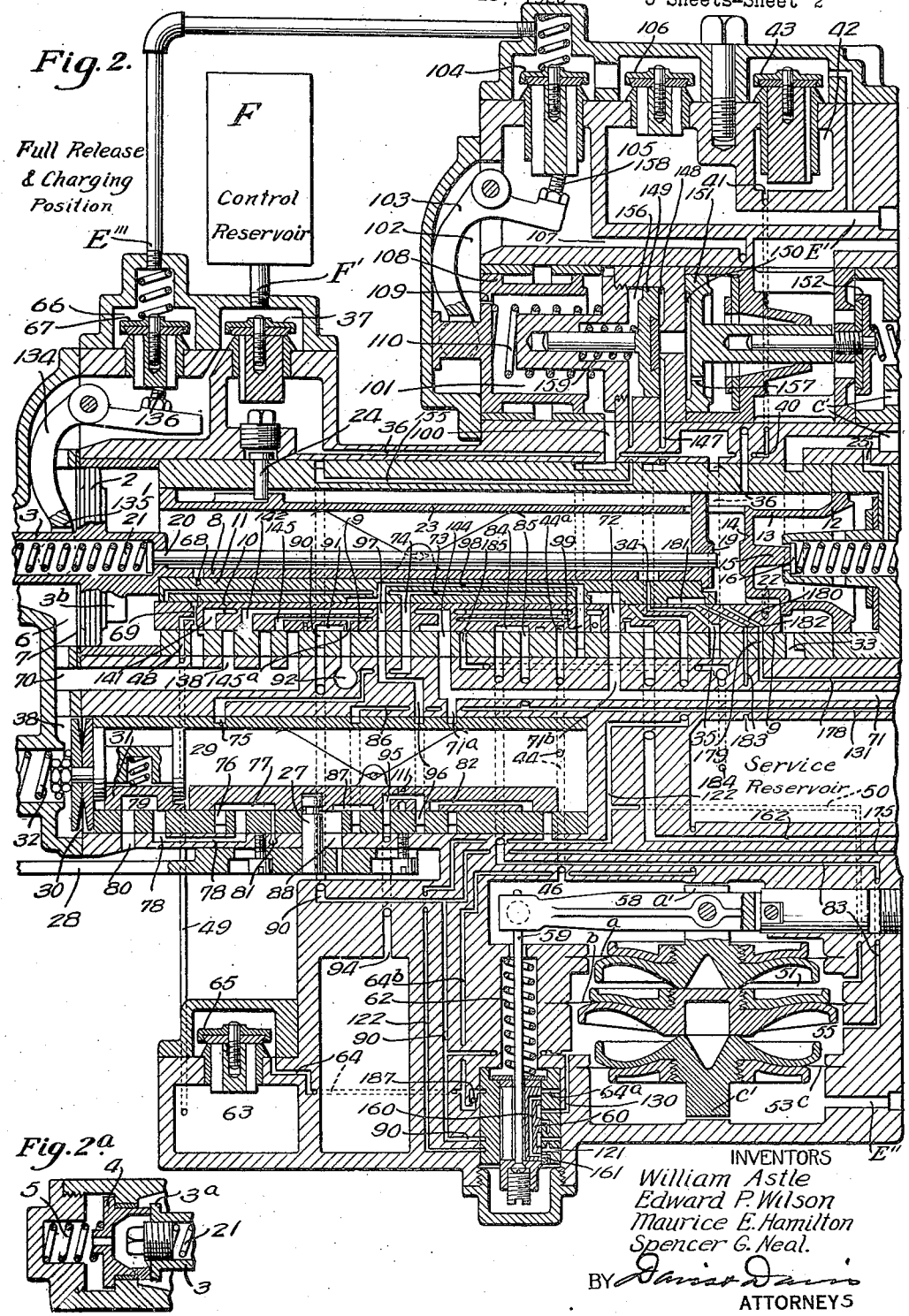
Figure 3:
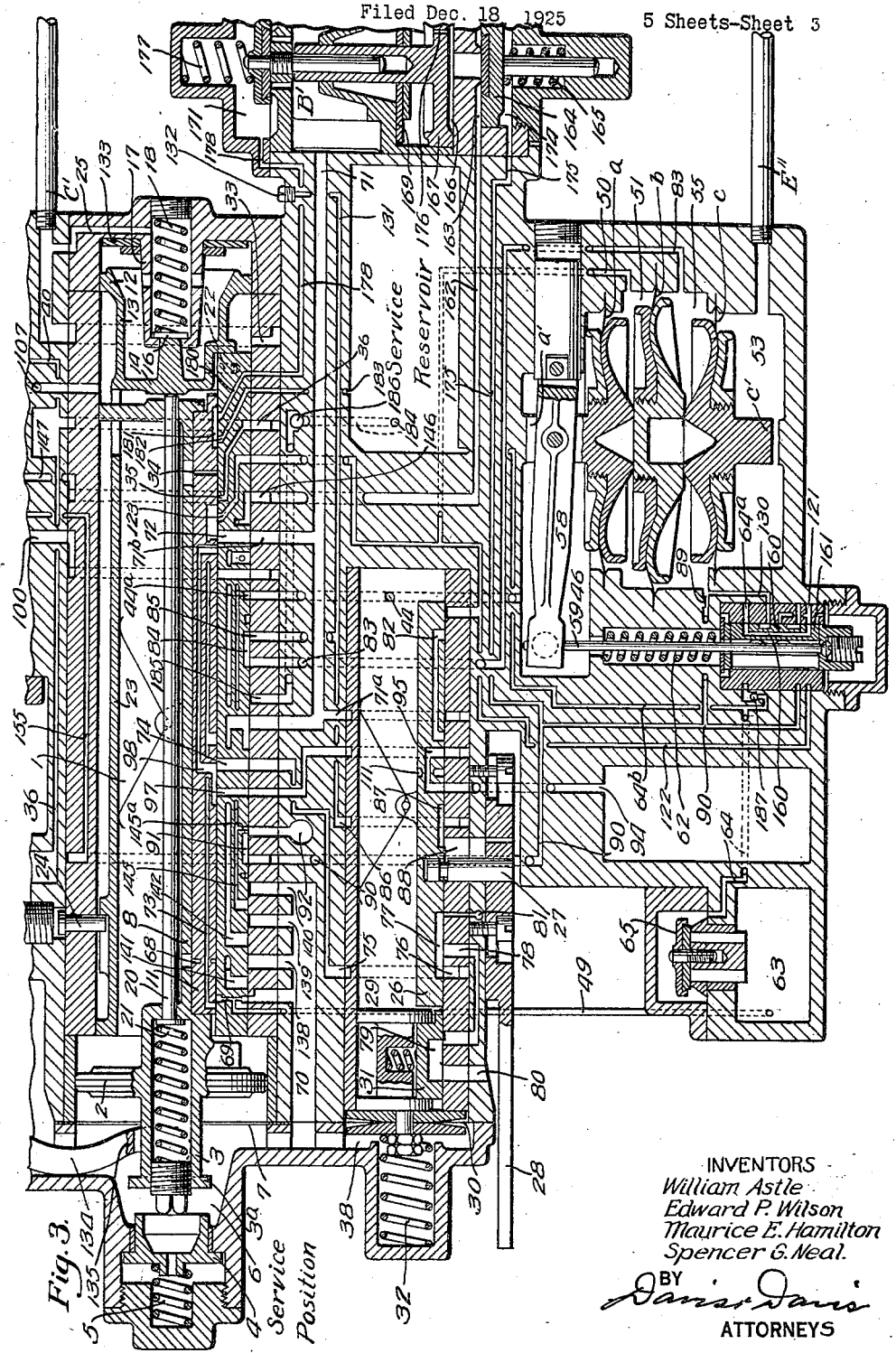
Figure 4:
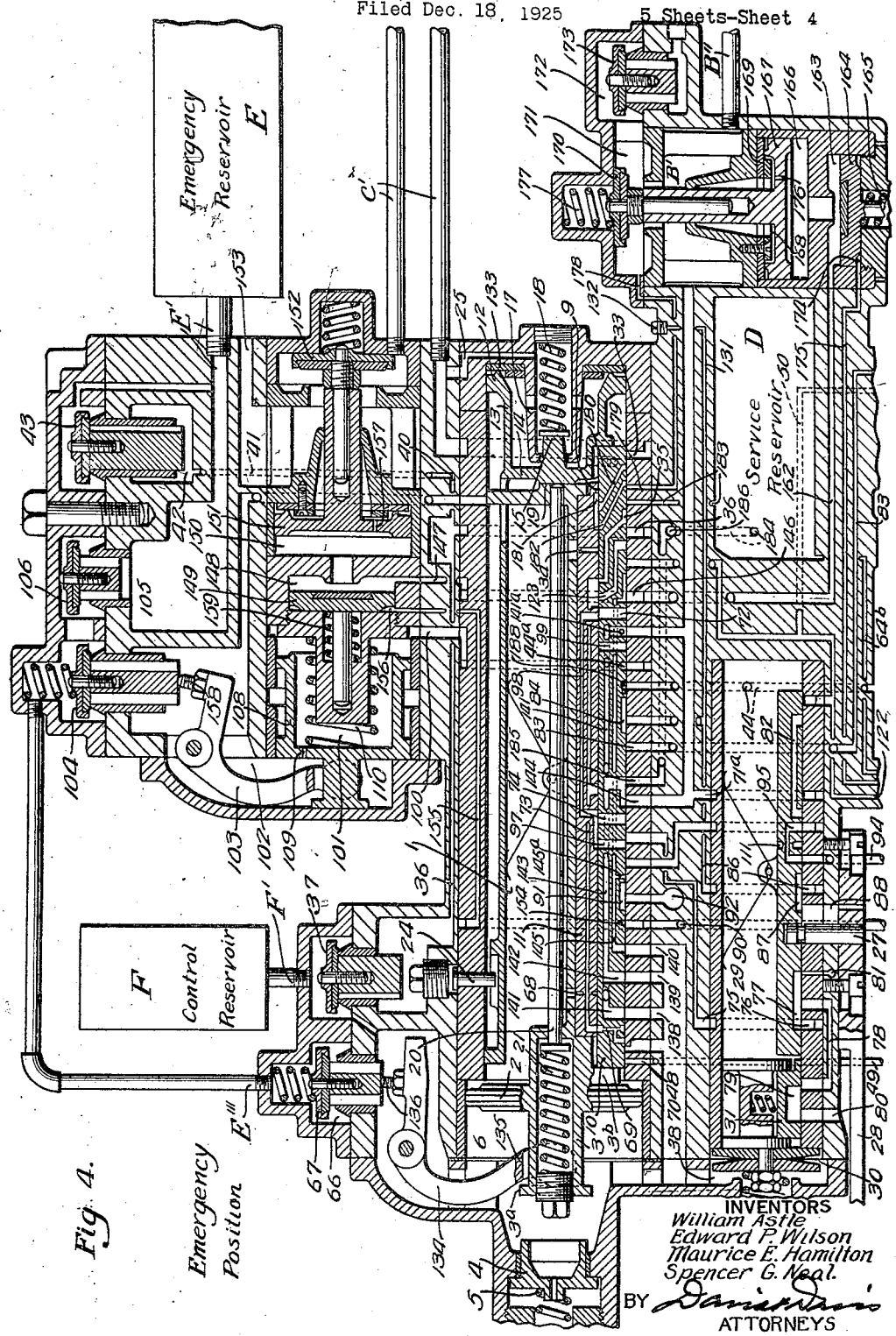

In the drawings:

Fig. 1 is a diagrammatic sectional view of the apparatus showing the control valve in full release and charging position;

Fig. 2 a view similar to Fig. 1 showing the control valve on a slightly larger scale, portions of the valve being broken away;

Fig. 2ª a detail sectional view showing the normal charging stop, said portion being broken away in Fig. 2;

Fig. 3 a diagrammatic sectional view of a portion of the control valve showing the parts in service braking position;

Fig. 4 a diagrammatic sectional view of a portion of the control valve showing the parts in emergency braking position;

Fig. 5 an enlarged sectional view of the service braking pressure regulating valve showing the parts in release position;

Fig. 6 a detail sectional view of the service braking pressure regulating valve, the valve being shown as approaching service position; and Fig. 7 a detail sectional view of the release governing valve showing the parts in graduated release position.

In order to simplify the description of the control valve the various parts and the ports and passages will not be specifically described except in connection with the description of the various operations of the control valve.

In the diagrammatic view, Fig. 1, A designates the control valve, B the brake cylinder, C the brake pipe, D the service reservoir, E the emergency reservoir, and F the control reservoir.

The main function determining valve device comprises a main valve chamber 1. In this chamber is arranged the main actuating piston 2. The piston 2 separates the main valve chamber 1 from a control reservoir chamber 6. The brake pipe is directly connected to the main valve chamber and the control reservoir is directly connected to the chamber 6 so that brake pipe pressure is on the inner side of the piston 2 and control reservoir pressure is on the outer side of said piston. The piston 2 is formed with an outwardly extending tubular extension 3, the outer end of which is adapted to abut against a spring-pressed normal charging stop 4, said stop being held in its normal position by a spring 5. Stop 4 is arranged to hold the piston 2 slightly inwardly from a stop wall 7 so that an excessive brake pipe pressure in chamber 1 will force the piston 2 outwardly against the tension of the spring 5 until said piston abuts against the rigid stop wall 7 of the valve casing. This slight excess movement of the piston under an excessive pressure in chamber 1 is for the purpose of cutting off the brake pipe port to the emergency reservoir and opening a small port leading only to the control reservoir.

This operation will be more fully hereinafter described. The piston 2 is formed with an inwardly extending valve engaging portion 8, said inwardly extending portion also serving as a guide for the piston and the valve connected thereto. On the main valve seat 9 is arranged a main slide valve 10 and on top of said valve 10 is arranged a supplemental slide valve 11, this latter valve being connected to the piston 2 by the inwardly extending part 8. Valve 11 moves with the piston and slides on top of the main valve 10.

In the opposite end of the main valve chamber from the piston 2 is arranged a small service stop piston 12, said piston having an inwardly extending cup-shaped portion 13. The inner wall 14 of this cup-shaped portion is provided with a central outwardly extending stop lug 15 which normally bears against a washer 16 arranged in an inwardly projecting tubular extension 17 of the valve casing. In this tubular extension is arranged a service stop spring 18. The inner wall 19 of the extension 8 is adapted to engage the inner side of the wall 14, said wall 14 serving as a limiting stop for the supplemental slide valve when the piston 2 is moved inwardly upon a service reduction of brake pipe pressure. Mounted in the guide portion 8 is a central longitudinally extending service stop rod 20, one end of which extends into the tubular portion 3 of the main piston 2. Within said tubular portion, the rod 20 is formed with a head which is adapted to engage one end of a comparatively light spring 21. Said spring maintains the rod normally in position so that its free end projects slightly beyond the end wall 19 of the part 8. The end of the rod 20 is adapted to engage the wall 14 and to serve as a service stop for the supplemental valve. Should the brake pipe reduction be sufficient to permit the control reservoir air in chamber 6 to move the piston 2 slightly beyond its service application position, spring 21 will be compressed and the wall 19 will be brought into engagement with stop wall 14. This slight excess movement of the supplemental valve beyond service position will open a port to permit control reservoir air to flow to the brake cylinder to thereby reduce the pressure on the outer side of piston 2 and prevent the slide valves going to emergency position.

The cup-shaped portion of the service stop piston 12 is connected directly to the main slide valve by a pin 22. The piston 12 is also formed with an inwardly extending guide portion 23, said guide portion being arranged to engage a fixed stop 24, said stop positively determining the inner position of the piston 12 and the normal position of the main slide valve. The main slide valve remains in its normal position during all operations of the main valve device except when it moves to emergency position, as will be hereinafter described. The piston 12 forms a small supplemental brake pipe chamber 1ª which is separated from the main valve chamber 1 by said piston. The supplemental chamber 1ª is connected directly to the brake pipe by passage 25.

The manually operable release governing valve consists of a slide valve 26 which is connected by a stem 27 to an operating rod 28. The stem 27 extends upwardly through an operating slot and the said slot serves as a means to limit the in-and-out sliding movement of the valve. To place the valve 26 in its quick release position the operating rod is pulled out, and to place it in its graduated release position the said rod 28 is shoved inwardly. The valve 26 is arranged in a valve chamber 29 and the outer end of this chamber is closed by an exhaust-rate-regulating diaphragm 30. Connected to this diaphragm is a small exhaust-rate-regulating valve 31. A spring 32 bears on the outer side of the diaphragm 30 and holds the valve 31 in its normal release position. The release governing valve chamber 29 is connected directly to the main valve chamber 1 so that brake pipe pressure will always be registered in said chamber. An excess brake pipe pressure in said chamber 29 will move the valve 31 into restricted release position.

*Release and charging.*

In charging the system brake pipe air flows through the brake pipe connection C', passage and port 33, into the brake pipe chamber 1 of the main control valve, forcing the main piston 2 toward the left until it is stopped by the normal charging stop 4. From the main control valve chamber air passes through port 34 of the valve 11, through port 35 in the main slide valve and passage 36, past check valve 37 to the control reservoir connection F', and also into chamber 6 on the control reservoir side of the piston 2. It also passes down into chamber 38 on the control reservoir side of the exhaust rate regulating valve diaphragm 30. From the passage 36 brake pipe air travels through passage 40 into a passage 41 which leads to a chamber 42, and then past check valve 43 to the emergency reservoir connection E'. Air also passes from the main valve chamber 1 through port 44ª in the main slide valve 10, port and passage 44 into the release governing valve chamber 29 and also down into an actuating chamber 46 above an actuating diaphragm *a*. From the control reservoir chamber 6 air will pass into extension 70 of said chamber and thence to a restricted port 69 in the main slide valve. From said port air will flow through a restricted charging port 48 in the main slide valve through a passage 49 down into the control reservoir chamber 63, thence past check valve 65, through passage 64 which leads to a service port 64ª in the seat of the service brake pressure regulating valve 60. A passage 64ᵇ leads to the service reservoir D so that said service reservoir will be charged from the control reservoir chamber 6 through the ports and passages just enumerated. The check valve 65 is interposed between the chamber 63 and the passage 64 to prevent the flow of service reservoir air back to chamber 63, said chamber being in open communication with the control reservoir in all positions of the main slide valve except emergency position.

A brake cylinder chamber 51 is formed between the actuating diaphragm $a$ and the equalizing diaphragm $b$. This latter diaphragm is larger in area than the actuating diaphragm, for the purpose which will hereinafter appear. The emergency reservoir E is connected at E'' to the emergency reservoir chamber 53 below the emergency diaphragm $c$. Between the diaphragms $b$ and $c$ is formed a retention chamber 55, for purposes which will be hereinafter described. The emergency diaphragm carries a downwardly extending release stop $c'$ and the actuating diaphragm carries an upwardly extending application stop $a'$. These stops limit the movements of the diaphragms. In the actuating chamber is arranged a lever 58. One end of this lever is pivoted on a rigid post secured to the wall of the actuating chamber, the other end thereof being connected to a valve rod 59. Intermediate its ends the lever 58 is pivotally connected to the upwardly extending stop stem $a'$ so that the lever will be swung up-and-down by the up-and-down movements of the actuating diaphragm. On the lower end of the valve rod 59 is secured a brake cylinder pressure regulating and maintaining valve 60, said valve being held yieldingly to its seat. Surrounding the valve stem is a lap spring 62 which bears at its lower end upon the valve 60 and at its upper end against a suitable stop formed in the valve casing. When the actuating diaphragm is moved upwardly the valve 60 is pulled upwardly against the tension of the lap spring. When the desired pressure has been built up in the brake cylinder chamber 51 the pressure regulating valve will be moved downwardly to lap position by the excess pressure on the larger equalizing diaphragm $b$. The lap spring will assist the pressure in the brake cylinder chamber 51 in moving the pressure regulating valve to lap position. When the valve is relieved of the spring pressure it will remain in lap position. When the pressure in the actuating chamber is raised for the purpose of securing a release of brake cylinder pressure the actuating diaphragm will be moved downwardly and the pressure regulating valve will be moved down to release position. Upon a reduction of brake pipe pressure the pressure in the actuating chamber will be reduced and then the undisturbed emergency reservoir pressure in the emergency pressure chamber 53 will move all the diaphragms upwardly and carry the pressure regulating valve to application position. In this movement of the regulating valve spring 62 will be placed under compression.

The emergency reservoir is connected at E''' to a chamber 66 and is held therein by the emergency reservoir check valve 67. In normal charging, the emergency reservoir, the control reservoir and the service reservoir are charged at the same time. With an abnormal charging pressure in the brake pipe and in the main valve chamber 1 the valve 11 is moved sufficiently to cut off communication between port 34 and port 35. This stops the charging of the emergency reservoir so long as there is an excessive pressure in the brake pipe. The excessive pressure in chamber 1 moves the piston 2 against the tension of the charging stop spring 5 and the normal charging stop 4. The slight excess movement of the supplemental valve 11 brings a supplemental charging port 68 into register with the port 69 in the main slide valve, which connects with the extension 70 of the control reservoir chamber 6 so that air may flow through said port 68 into the chamber 6 and thence into the control reservoir. Air will also flow from port 69 through port 48, passage 49 into chamber 63 and then past check valve 65 into passages 64 and 64ᵇ to the service reservoir D. When the control reservoir pressure and the pressure in the main valve chamber have equalized, or substantially so, the supplemental valve will be moved back to normal charging position and thereafter air will flow from the chamber 1 to the emergency reservoir, the control reservoir and the service reservoir as before described, ports 68 and 69 being then out of register.

In the quick release position of the release governing valve brake cylinder pressure will be released to atmosphere through chamber B' of the brake pipe air admission valve, passage 71, port 71ᵇ, port 72 of the main slide valve, port and passage 73 of the supplemental slide valve, port 74 of the main slide valve, passage 75, port 76 in the seat of the release governing valve, cavity 77 in the release governing valve, port and passage 78 in the release governing valve seat, cavity 79 in the release regulating valve 31 and atmospheric port 80. Brake cylinder pressure will also flow from 77 to atmospheric port 81. This is a restricted port and when valve 31 is in closed position port 78 will be closed and brake cylinder pressure will then exhaust through port 81 alone. 80 will be cut off from 78. Valve 31 will be moved when there is excess brake pipe pressure in release governing valve chamber 29.

In the quick release position of the release governing valve pressure will flow from the retention chamber 55 of the diaphragm section through port and passage 83, cavity 84 in the main slide valve, passage 85, passage 86 to cavity 87 in the release governing valve and then to atmosphere through the operating slot 88 of the release governing valve. Pressure from chamber 55 will also blow down through the restricted port 89, passage 90, cavity 91 in the main slide valve, and atmospheric port 92.

With the release governing valve in graduated release position port 86 is cut off from the exhaust slot 88. In this position of the release governing valve the blow down from the retention chamber 55 will be through the restricted port 89 up to atmospheric port 92.

In the quick release position of the release governing valve the quick release chamber 93 is connected by passage 94 with a port 95 in the release governing valve. Port 95 connects to port and passage 96 which leads to a port 97 in the main slide valve, this latter port being connected to a port 98 in the supplemental slide valve. 98 is connected to a port 99 in the main slide valve and this port registers with a port and passage 100 which leads to the quick release piston chamber 101. Chamber 101, therefore, will be vented to the quick release chamber 93 in the release position of the main and supplemental slide valves, when the release governing valve is in quick release position. When the chamber 101 is vented to chamber 93, which has previously been vented to atmosphere, the pressure in chamber 102 will force the quick release piston inwardly against its spring and throw the lever 103 and open the quick release valve 104. When the quick release valve 104 is open emergency reservoir air will flow from chamber 105 past check valve 106, past valve 104 into chamber 102 and thence through passage 107 to the main valve chamber 1. From chamber 1 the emergency reservoir air will flow through the charging passage 33 to brake pipe. The quick release piston 108 is provided with a small leak port 109 so that the pressures on opposite sides are equalized and the piston will be moved to its normal position by its spring 110.

In the graduated release position of the release governing valve passage and port 94 is connected to port 86 so that the chamber 93 is added to the volume of chamber 55. Chamber 101 will not be vented when the main slide valve goes to release position. Port 96 will be connected to the release governing valve chamber 29 through a port 111 in the release governing valve so that brake pipe air will be maintained in chamber 101 thereby preventing the operation of the quick release piston. In the service position of the supplemental slide valve, chamber 93 is vented to atmosphere through the main exhaust port so that the air delivered into said chamber in the quick release operations will be vented to atmosphere when the supplemental valve is moved to service position.

*Service application.*

A service application of the brakes is brought about by a service reduction in brake pipe pressure in the usual manner. A service reduction of brake pipe pressure in chamber 1 will result in a movement of the piston 2 inwardly, or toward the right, as viewed in the drawings, because of the control reservoir pressure on the left hand face of the piston. The piston and the supplemental slide valve will move inwardly until the spring-pressed rod 20 contacts with the service stop 14, said service stop forming a part of the service stop piston 12. The service stop piston and the service stop are held in position by the spring 18. The piston 2 will move to service position on a reduction of brake pipe pressure in chamber 1. If there is a rapid pressure reduction the rod 20 will compress the spring 21 and permit the supplemental valve to have a slight excess movement. Spring 21 is lighter than spring 18 so that it will compress before the service abutment 14 is moved against the force of the spring 18. The slight excess movement of the supplemental valve will bring port and passage 73 of the supplemental slide valve into register with port 69. In this position of the supplemental slide valve one end of the port and passage 73 is in register with the main slide valve port 72 and this latter is in register with the service brake cylinder port 71$^b$. Control reservoir pressure will flow up through port 69 into port and passage 73 and thence through port 72 and 71$^b$ to the brake cylinder. This flow of air will continue until the control reservoir pressure in chamber 6 has substantially balanced with the brake pipe pressure in chamber 1. The spring 21 will then move the piston 2 and the supplemental slide valve back to true service position thereby moving the port 73 out of register with the port 69. This will prevent the piston 2 and the main slide valve moving to emergency position and the excess pressure in the control reservoir will be fed into the brake cylinder. The outlet end of port and passage 73 is elongated in order to maintain communication with the brake cylinder port 72 during this excess movement.

A service reduction of pressure in the actuating chamber 46 will result in an upward movement of the diaphragms $a$, $b$ and $c$ due to the emergency reservoir pressure in chamber 53. The upward movement of the diaphragms will move the valve lever 58 and the valve 60 upwardly. The upward movement of the valve 60 connects the service port at the end of the passage 64 to a port and passage 160 of the valve 60 and this port 160 is in communication with a brake cylinder port 121 connected to a passage 122. During the upward movement of the valve 60 the brake cylinder port 121 is for a brief period connected by port 160 and port 161 to the chamber of valve 60 to permit the brake pipe air to flow from the said valve chamber through passage 122 to the brake cylinder. Passage 122 leads to a port 123 in the main slide valve. Port 123 is in communication with port 73 of the supplemental valve 11 and said port is in communication with the brake cylinder port 72 of the main slide valve, said port being at this time in direct communication with the service brake cylinder port 71$^b$ and with the brake cylinder passage 71.

Brake cylinder pressure will flow from passage 122 into passage 50 and then into the brake cylinder pressure chamber 51 of the diaphragm structure. Brake cylinder pressure will be built up until the pressure in chamber 51 operating on the equalizing diaphragm $b$ plus the brake pipe pressure on the actuating diaphragm $a$ overcomes the emergency reservoir pressure in chamber 53. The pressure regulating valve 60 will then go to lap position and shut off further flow of reservoir air to the brake cylinder.

The connection between port 161 and the brake cylinder port 121 will be brief and only during a period of the upward movement of the valve 60 to service position (see Fig. 6). This will permit a certain amount of air to pass from the actuating chamber 46 to the brake cylinder and thereby make the action of the diaphragm structure positive and rapid. Passage 64 is connected directly to the service reservoir by passage 64$^b$. If the service reservoir pressure is higher than the control reservoir pressure in chamber 63 check valve 65 will be held to its seat and service reservoir pressure alone will flow to the brake cylinder. If the service reservoir pressure is drawn down below the control reservoir pressure in chamber 63 the check valve 65 will open and air will then flow from both of said reservoirs to the brake cylinder. When the valve 60 reaches service position the port 161 is closed and brake pipe air from chamber 46 cannot then flow to the brake cylinder.

The equalizing diaphragm is properly proportioned with respect to the actuating diaphragm to secure the desired brake cylinder pressure for a given brake pipe reduction. Usually these diaphragms are so proportioned as to bring about a two-and-one-half to one brake cylinder pressure ratio, that is to say, for a ten pound brake pipe reduction a twenty-five pound brake cylinder pressure will be built up before the pressure regulating valve is moved to lap position.

The supplemental valve 11 will remain in service position. This valve has no service lap position. Should the brake cylinder pressure leak down the pressure in the brake cylinder chamber 51 will be reduced and the emergency reservoir pressure will then move the pressure regulating and maintaining valve to service position and the brake cylinder pressure will be built up from the reservoirs and will be maintained at the predetermined ratio to the brake pipe reduction.

With the release-governing valve in graduated-release position air will flow from passage 122 into the port 82 of the release-governing valve and thence through passage 71$^a$, which at this time is in register with one end of the port 82, to the brake cylinder passage 71. The purpose of this is to permit the pressure regulating valve 60 in service position to deliver air directly to the brake cylinder in advance of the movement of the supplemental valve to service position. The passage 71$^a$ also permits brake cylinder pressure to flow back through passage 122 when the pressure regulating and maintaining valve 60 is in release position.

When the supplemental slide valve 11 is in service position port and passage 100 is closed and there will be no possibility of a movement of the quick release piston 108 to quick release position. The pressures in chambers 101 and 102 will be equalized at all times through the equalizing port 109 and spring 110 will prevent any undesired movement of the quick release piston.

When the supplemental slide valve is in service position the brake pipe is connected directly to the service reservoir so that if the pressure in said reservoir is below the brake pipe pressure air will flow into said reservoir. The passages through which the brake pipe air is fed directly into the service reservoir, with the supplemental slide valve in service position, are entirely independent of the normal charging passages, and this compensating flow of air is controlled by a brake pipe air admission valve. This admission valve also controls the flow of brake pipe air to the brake cylinder when the main and supplemental slide valves are in emergency position. Brake pipe air admission valve will be fully described in connection with the emergency operation of the control valve.

*Release after service.*

For a release of brake cylinder pressure after a service application of brakes the brake pipe pressure is increased in the usual manner through the manipulation of the engineer's brake valve. The increase in brake pipe pressure is registered in chamber 1 and also in the actuating chamber 46. Piston 2 will be moved back to release position and the actuating diaphragm will be depressed moving the valve 60 down to release position, (see Fig. 5). In the release position of the valve 60 the service reservoir passage and port 64 will be closed. The brake cylinder port 121 will be connected by a cavity 128 in the valve 60 to the release port and passage 90 which leads to a cavity 91 in the main slide valve and said cavity is connected to the atmospheric port 92. Brake cylinder port 121 will be connected to the retention chamber 55 through a cavity 129 in the regulating valve 60 and through passage 130 so that brake cylinder pressure will flow into said chamber. With the release governing valve in quick release position air from the retention chamber will flow through passage 83, cavity 84 in the main slide valve, port 85, passage 86, cavity 87 of the release governing valve and to atmosphere through slot 88. With the release governing valve in graduated release position port 86 will be cut off from slot 88 and there will be no flow of air from chamber 55 through passage 83 except to chamber 93. Air from chamber 55 will also slowly blow down through the restricted port 89, passage 90 and atmospheric port 92. In the graduated release position of the release governing valve air from chamber 55 will escape only through the restricted port 89.

The blow-down port 89 is quite small so that the pressure in the chamber 55 will be retained at a diminishing rate slightly below the brake cylinder pressure. The pressure in chamber 55, that is the differential energy created on the larger controlling diaphragm $b$, opposes the brake cylinder pressure in chamber 51 and tends to move the valve 60 back to lap position. If, while there is pressure in the retention chamber 55 the brake pipe pressure is reduced in order to bring about another application of the brakes, or an increased application of the brakes, the valve 60 will again move to application position and air under pressure will again be delivered to the brake cylinder. It is to be noted that when the valve 60 again goes to service position the port 130 is closed, thereby preventing any further flow of pressure to the retention chamber 55. Port 89 remains open. The brake cylinder pressure must now be built up an additional amount to overcome the differential energy created on the controlling diaphragm $b$ by the pressure retained in chamber 55. Air will continue to flow into the brake cylinder until the pressure has been built up sufficiently to compensate for the loss of pressure in chamber 46 and also to overcome the pressure in chamber 53. This will result in a higher brake cylinder pressure than would have resulted ordinarily, or in the first instance, from the given brake pipe reduction. Should the engineman again increase his brake pipe pressure for a release, or a partial release of brakes, the valve 60 will again connect the brake cylinder to the retention chamber 55 and to atmosphere. Should the engineman then again reduce the brake pipe pressure the brake cylinder pressure will be still further built up. This is what is known as "cycling" and is the ordinary and usual operation when running down a grade a train equipped with the standard Westinghouse freight brake. When the grade is heavy the cycling operations are frequent and the periods of application-and-holding, and release-and-recharging are short, about thirty to sixty seconds, and this short cycling will result in building up a heavy brake cylinder pressure. Where the grade is low the cycling periods are longer, and the slow cycling will not build up as heavy a brake cylinder pressure as will the rapid cycling because the brake cylinder pressure will be released to a lower pressure and likewise the pressure in chamber 55. The amount of pressure retained in the retention chamber 55 will govern the build up of brake cylinder pressure during the cycling operations. It is manifest therefore that if the release-and-recharging periods are brief as when braking on heavy grades, a greater pressure will be retained in the retention chamber 55 and consequently a greater brake cylinder pressure must be built up on the next service operation in order to overcome the retained pressure in chamber 55. When the brake cycles are less frequent, as when braking on light grades, the release-and-recharging operations are long and the pressure in chamber 55 has a greater period of time during which it may blow down through the passage 89. The result of this is that the build-up of brake cylinder pressure on the next application-and-holding operation will not be so great because there will not be as high a pressure in chamber 55 as there would have been if the application-and-holding operation followed a short release-and-recharging operation. It is also manifest that if the release-and-re-charging operation is continued for a considerable period the pressure in chamber 55 will blow down completely and then upon the next service application the brake cylinder pressure will be built up only in proportion to the differential area of the diaphragms for a given brake pipe reduction. When the valve 60 is in release position the entire brake cylinder pressure is free to blow down. When the said valve is in lap position any pressure in the retention chamber is free to blow down through the restricted port 89.

With the release governing valve in quick release position, the quick release piston chamber 101 will be vented to the quick release chamber 93 and the quick release piston will be operated inwardly and the quick release valve 104 will be opened, thereby permitting emergency reservoir air to flow to the brake pipe through the main valve chamber 1. When the pressure in the quick release chamber 93 has equalized with the emergency reservoir pressure in chamber 102, through the equalizing port 109, the quick release piston will be moved outwardly and quick release valve 104 will be closed. By varying the size of the port 109 the length of time during which the valve 104 will remain open may be varied. By varying the size of port 107 the velocity of the flow of emergency reservoir pressure to brake pipe may be varied. This velocity is at such a rate that the increase of brake pipe pressure from this source will not move valve 31 to closed position.

The quick release lever 103 is provided with an adjustable screw 158 which is adapted to engage the quick release valve 104 and lift it from its seat. By properly adjusting the screw 158 the quick release lever can be rendered inoperative to lift the quick release valve. This will prevent the flow of emergency reservoir air to the brake pipe in release operations with the release governing valve in quick release position.

The passage 86 is connected to atmosphere through passage 131 and said passage is closed by a removable plug 132. By removing the plug 132 the retention chamber 55 is directly open to atmosphere at all times except in emergency applications, regardless of the position of the release governing valve. This renders the retention chamber ineffective and cuts out the additional brake cylinder pressure build-up in cycling operations.

The supplemental valve in service position connects port 97 of the main slide valve to port 74 of the main slide valve through an extension of the port 98. This places the chamber 93 in communication with the atmosphere through the quick release exhaust port 80.

In the graduated release position of the release governing valve, port 94 is connected to port 86 through the cavity 87 in the release governing valve. This connects the quick release chamber 93 to the retention chamber 55 and augments the volume of that chamber.

*Emergency.*

An emergency reduction in brake pipe pressure in the main valve chamber 1 results in a movement of the piston 2 inwardly to emergency position. The service stop piston 12 is moved over to the limit of its movement to emergency position and forms an air seal against gasket 133. In the control reservoir chamber 6 is pivoted an emergency lever 134. One arm of this lever is formed with a yoke 135 which fits around the extension 3 of the main piston 2. The other arm of the lever is provided with a contact screw 136 which is adapted to engage the lower end of the emergency valve 67, and lift it from its seat. The yoke 135 is adapted to be engaged by the flange 3$^a$ on the outer end of the tubular extensions 3 of the piston 2 when said piston has nearly reached its final emergency position. The emergency lever is so proportioned that a slight movement of the yoke end thereof will be sufficient to unseat the valve 67. It is desirable to have as much clearance between the flange 3$^a$ and the yoke 135 as is possible in order to prevent the opening of valve 67 in all movements of the piston 2 except in a desired emergency application. The emergency valve 67 is opened and emergency reservoir air flows into control reservoir chamber 6 and into chamber 70. It also flows down into chamber 38 against the diaphragm 30. The abutment 3$^b$ on the piston 2 engages the main slide valve and moves it inwardly to emergency position. Brake pipe port 33 is closed by the main slide valve. The charging port 36 is closed by the supplemental slide valve and the main slide valve. Emergency reservoir air and control reservoir air flow from chamber 70 through the ports 138, 139 and 140. From port 139 air will flow into port 142 in the main slide valve, passage 143 in the main slide valve to the emergency brake cylinder port 144. From port 138 air will flow into port and passage 141 of the main slide valve and through said passage 141 to the service brake cylinder port 71$^b$ and thence to the brake cylinder. Air will flow through passage 140 into port and passage 145 in the main slide valve and thence to port 146, passage 147 to a chamber 148 back of emergency valve 149. The pressure in chamber 148 will force valve 149 from its seat and permit the air to flow into chamber 150 back of emergency vent valve piston 151. The pressure will force said piston inwardly and unseat an emergency vent valve 152. When valve 152 is unseated the brake pipe will be opened to a large atmospheric port 153. When the main slide valve is in emergency position a small port 154 in the main slide valve will connect the valve chamber 1 to passage 155 which leads to chamber 156 in front of valve 149 so that air will flow into said chamber 156. The length of time during which the valve 149 will remain open will depend upon the size or capacity of the port 154 and chamber 156, so that by properly proportioning this port and said chamber the time required to build up an equalizing pressure in chamber 156 may be nicely regulated. Pressure will build up in chamber 156 and when it has substantially equalized with the pressure in chamber 148, valve 149 will be seated by a spring 159. When the valve 149 has seated pressure on opposite sides of the vent valve piston 151 will be equalized through the leak port 157 whereupon the brake pipe vent valve 152 will be seated by its spring. When the brake pipe vent valve 152 is open, air from chamber 1ª will be vented to atmosphere.

From port 146 air will flow through passage 162 into a chamber 163 on top of a check valve 164 and force said valve from its seat against the pressure of a spring 165. When said valve is unseated air will flow into chamber 166 below a piston 167 and will move said piston upwardly in its chamber 168. The piston 167 will seal against a gasket 169 secured to the upper wall of the chamber 168. The upward movement of the piston 167 will unseat a brake pipe air admission valve 170 and open the large chamber B' to chamber 171 which is directly connected to the brake pipe through chamber 172. In chamber 172 is a check valve 173 which seats toward the brake pipe connection. This check valve will permit brake pipe air to flow into chambers 172 and 171 but will prevent air flowing from said chambers back to the brake pipe. When the admission valve 170 is open brake pipe air may flow past valve 173 and into the chamber B' and thence to the brake cylinder through the brake cylinder connection B''. This will permit brake pipe air to pass to the brake cylinder for an emergency application of the brakes provided the pressure in the brake pipe is greater than the pressure in the chamber B'. If the pressure in chamber B' is greater than the brake pipe pressure valve 173 will be held to its seat by the superior pressure flowing from chamber B'.

Below the check valve 164 is a chamber 174, and this chamber is connected by a passage 175 to the passage 90. Passage 90 will receive air from the small port 154 in the main slide valve so that pressure will be built up in chamber 174 from the main valve chamber 1, in the emergency position of the main slide valve. When the pressures on opposite sides of the valve 164 have equalized, or substantially so, the spring 165 will seat valve 164 and thereupon there will be an equalization of pressures on opposite sides of the piston 166 through the small leak port 176 in the piston 167. When this equalization has taken place, or substantially so, the spring 177 will seat the admission valve 170.

In the emergency position of the main slide valve emergency air will flow from chamber 70 through port 140, the port and passage 145 of the main slide valve, port 146 and then to the chamber 148 and to the chamber 163. This will result in opening the brake pipe vent valve 152 and the brake pipe air admission valve 170. A part of the brake pipe air will then flow to the brake cylinder through chamber B' and the brake pipe will also be vented to atmosphere. It is also to be noted that in the emergency position of the main slide valve air will flow from the main valve chamber 1, through the small port 154 and thence through passages 90 and 155 to the chamber 156 and from passage 90 through passage 175 to the chamber 174 thus bringing about the closing of the two check valves 149 and 164. In all positions of the main slide valve, except the emergency position, chambers 156 and 174 are vented to atmosphere through the atmospheric port 92. In all positions of the main slide valve, except emergency position, chambers 148 and 163 are vented to atmosphere through port and passage 145 and the small leak port 145ª leading therefrom to the atmospheric port 92.

The chamber 171 is connected by a passage 178 to a port 179 in the main slide valve seat. In the main slide valve is a port 180 which in the normal position of the main slide valve connects port 179 with the chamber 1 so that in the release position of the supplemental slide valve brake pipe pressure from chamber 1 will flow into chambers 171 and 172 to hold the check valves 170 and 173 seated. The supplemental slide valve is provided with a cavity 181 which in the service position of the said supplemental valve will connect port 180 with port 182 of the main slide valve, this latter port in the normal position of the main slide valve registering with a port and passage 183 which leads into the service reservoir D so that in the service position of the supplemental slide valve service reservoir pressure will be in chamber 171 and chamber 172 in order to hold the check valves 170 and 173 seated. In the emergency position of the main slide valve ports 179 and 183 are closed.

The service reservoir is connected by a passage 184 to a port 185 in the main slide valve seat. In the emergency position of the main slide valve port 143 connects port 185 to the emergency brake cylinder port 144 which leads directly into the brake cylinder passage 71. In the passage 184 is placed a check valve 186, said check valve permitting the air to flow from the service reservoir to the port 185 and preventing air from flowing back from the emergency brake cylinder port 144 into the service reservoir. When the main slide valve is in emergency position ports 69 and 48 are closed so that air cannot flow from chamber 70 to the chamber 63. This prevents emergency air flowing from chamber 70 back to the service reservoir through passages 64 and 64ᵇ.

Brake cylinder pressure will equalize in chambers 1, 6, 29, 46, 51, 55, 53, 156 and 174. The flow of pressure to all of these chambers is controlled by the main slide valve and the pressure regulating valve 60.

In the main slide valve a small port 141ª leads from port 141 into the main slide valve chamber 1. When the port 141 is in register with the service brake cylinder port, brake cylinder pressure will flow through port 141ª into the chamber 1 and equalize therein. The service braking pressure regulating valve will move to service position upon an emergency reduction of brake pipe pressure. This, however, will have no effect. The main slide valve in emergency position closes port and passage 122. In the quick release position of the release governing valve this passage 122 is also closed by said release governing valve. Brake cylinder pressure, therefore, cannot flow back toward service port 121 of valve 60. With the release governing valve in graduated release position, however, brake cylinder pressure might flow back through passage 71ª, port 82 of the release governing valve and port and passage 122 toward the port 121. To prevent this back flow of emergency brake cylinder pressure to the service reservoir a check valve 187 is placed in the passage 64 between the passage 64ᵇ and the service port 64ª in the seat of the valve 60. This check valve will permit air to flow from passages 64 and 64ᵇ to the port 64ª but will prevent air flowing back to the service reservoir and to the chamber on top of check valve 65. The purpose of this check valve is to prevent the high emergency brake cylinder pressure flowing back through passage 122, port 121, passage 160, port 64ª and thence to the service reservoir. Without this check valve emergency brake cylinder pressure would flow back to the service reservoir when the release governing valve was in graduated release position.

The main slide valve is provided with a small groove 188 in its face which in the emergency position of said valve connects the main slide valve chamber 1 to the port and passage 44. Air will flow from chamber 1 through groove 188 and through port 44 to the release governing valve chamber 29 and into the actuating chamber 46. Pressure will also be built up in the brake cylinder chamber 51 of the diaphragm structure, air flowing from the service reservoir into said chamber through ports and passages 64ᵇ, 64, port 64ª, port 160 of valve 60, port 121, passage 122, passage 50 to said chamber 51 until there is an equalization of pressures in the service reservoir and in chamber 51.

The ports in the main slide valve controlling the opening of the brake pipe air admission valve and the brake pipe vent valve may be so arranged that the brake pipe air admission valve will be opened slightly in advance of the opening of the brake pipe vent valve. This will ensure a portion of the brake pipe air flowing to the brake cylinder, in emergency application, in advance of the opening of the brake pipe vent valve.

*Charging service reservoir during service application.*

In the service position of the supplemental slide valve the service reservoir will be connected to chambers 171 and 172 through the passage 183, port 182 of the main slide valve, cavity 181 of the supplemental slide valve, port 180 of the main slide valve, port 179 and passage 178. Air will be drawn from the service reservoir for service braking applications. Whenever the pressure in the service reservoir is reduced below the brake pipe pressure, brake pipe air will flow past check valve 173, through chambers 172 and 171 and thence to the service reservoir, so that pressure in the service reservoir, in the service position of the supplemental slide valve, will always be equal to the brake pipe pressure and brake pipe air will be automatically fed into the service reservoir so long as the supplemental slide valve remains in service position.

*Release after emergency.*

The increasing brake pipe pressure being registered in chamber 1ª overcomes the pressure in chamber 1 and moves piston 13 and valve 10 to the left opening port 33 so that brake pipe air registers in chamber 1. The increasing brake pipe pressure in chamber 1 forces piston 2 and valve 11 to the left thereby opening the brake cylinder exhaust passage and the charging port. Brake cylinder pressure is then released to atmosphere and the reservoirs are recharged as previously described.

What we claim is:

1. A fluid pressure brake control valve comprising a main slide valve chamber, a main slide valve therein, a supplemental slide valve superposed on the main slide valve, a main actuating piston connected to the supplemental slide valve, a brake pipe connection with the main slide valve chamber, whereby brake pipe pressure will be applied to the inner side of the main actuating piston, means for applying control reservoir pressure to the outer side of said piston whereby a reduction of brake pipe pressure in the main valve chamber will result in an inward movement of the actuating piston and the supplemental slide valve to application position, means for holding the main slide valve stationary during the service movement of the supplemental slide valve, a service braking pressure regulating and maintaining valve device, means for moving said pressure regulating valve to service position upon a reduction of brake pipe pressure, means whereby said pressure regulating valve will place a service reservoir in communication with the brake cylinder through the main and supplemental slide valves when the said supplemental valve is in service position, and means whereby the brake cylinder pressure will move the said pressure regulating valve to lap position when the desired pressure has been built up in the brake cylinder.

2. A fluid pressure brake control valve comprising a main slide valve chamber, a main slide valve therein, a supplemental slide valve superposed on the main slide valve, a main actuating piston connected to the supplemental slide valve, a brake pipe connection with the main slide valve chamber, whereby brake pipe pressure will be applied to the inner side of the main actuating piston, means for applying control reservoir pressure to the outer side of said piston whereby a reduction of brake pipe pressure in the main valve chamber will result in an inward movement of the actuating piston and the supplemental slide valve to application position, means for holding the main slide valve stationary during the service movement of the supplemental slide valve, a service braking pressure regulating and maintaining valve device, means for moving said pressure regulating valve to service position upon a reduction of brake pipe pressure, means whereby said pressure regulating valve will place a service reservoir in communication with the brake cylinder, and means whereby the brake cylinder pressure will move the said pressure regulating valve to lap position when the desired pressure has been built up in the brake cylinder.

3. A fluid pressure brake control valve comprising a main slide valve chamber, a main slide valve therein, a supplemental slide valve superposed on the main slide valve, a main actuating piston connected to the supplemental slide valve, a brake pipe connection with the main slide valve chamber, whereby brake pipe pressure will be applied to the inner side of the main actuating piston, means for applying control reservoir pressure to the outer side of said piston whereby a reduction of brake pipe pressure in the main valve chamber will result in an inward movement of the actuating piston and the supplemental slide valve to application position, means for holding the main slide valve stationary during the service movement of the supplemental slide valve, a service braking pressure regulating and maintaining valve device, means for moving said pressure regulating valve to service position upon a reduction of brake pipe pressure, means whereby said pressure regulating valve will place a service reservoir in communication with the brake cylinder through the main and supplemental slide valves when the said supplemental valve is in service position, means whereby said pressure regulating valve during its movement to service position will temporarily connect the brake pipe to the brake cylinder, and means whereby the brake cylinder pressure will move the said pressure regulating valve to lap position when the desired pressure has been built up in the brake cylinder.

4. A fluid pressure brake control valve comprising a main slide valve chamber, a main slide valve therein, a supplemental slide valve superposed on the main slide valve, a main actuating piston connected to the supplemental slide valve, a brake pipe connection with the main slide valve chamber, whereby brake pipe pressure will be applied to the inner side of the main actuating piston, means for applying control reservoir pressure to the outer side of said piston whereby a reduction of brake pipe pressure in the main valve chamber will result in an inward movement of the actuating piston and the supplemental slide valve to application position, means for holding the main slide valve stationary during the service movement of the supplemental slide valve, a valve device operating upon a reduction of brake pipe pressure to connect a service reservoir and the control reservoir to the brake cylinder, and means to move said valve device to lap position when the desired pressure is in the brake cylinder and while maintaining the supplemental slide valve in service position.

5. A fluid pressure brake control valve comprising a slide valve chamber, a slide valve therein, an actuating piston connected to said slide valve, a brake pipe connection with the main slide valve chamber whereby brake pipe pressure will be applied to the valve chamber side of the actuating piston, means for applying a control reservoir pressure to the other side of said piston whereby a reduction of brake pipe pressure in the valve chamber will result in an inward movement of the actuating piston and the connected slide valve to application position, means for arresting the said slide valve in service position, a service braking pressure regulating and maintaining valve device, means for moving the said pressure regulating valve to service position upon a reduction of brake pipe pressure, means whereby said pressure regulating valve will place a service reservoir and the control reservoir in communication with the brake cylinder through the slide valve in the slide valve chamber when said valve is in service position, and means whereby the brake cylinder pressure will move the said pressure regulating valve to lap position when the desired pressure has been built up in the brake cylinder.

6. A fluid pressure brake control valve comprising a slide valve chamber, a slide valve therein, an actuating piston connected to said slide valve, a brake pipe connection with the main slide valve chamber, whereby brake pipe pressure will be applied to the valve chamber side of the actuating piston, means for applying a control reservoir pressure to the other side of said piston whereby a reduction of brake pipe pressure in the valve chamber will result in an inward movement of the actuating piston and the connected slide valve to application position, means for arresting the said slide valve in service position, a service braking pressure regulating and maintaining valve device, means for moving the said pressure regulating valve to service position upon a reduction of brake pipe pressure, means whereby said pressure regulating valve will place a service reservoir and the control reservoir in communication with the brake cylinder through the slide valve in the slide valve chamber when said valve is in service position, means whereby the brake cylinder pressure will move the said pressure regulating valve to lap position when the desired pressure has been built up in the brake cylinder, and means whereby the slide valve in service position will connect the service reservoir to the brake pipe.

7. A fluid pressure brake control valve comprising a slide valve chamber, a slide valve therein, an actuating piston connected to said slide valve, a brake pipe connection with the main slide valve chamber whereby brake pipe pressure will be applied to the valve chamber side of the actuating piston, means for applying a control reservoir pressure to the other side of said piston whereby a reduction of brake pipe pressure in the valve chamber will result in an inward movement of the actuating piston and the connected slide valve to application position, means for arresting the said slide valve in service position, a service braking pressure regulating valve device operating upon a reduction of brake pipe pressure to connect a service reservoir to the brake cylinder through the slide valve in the main slide valve chamber when the said slide valve is in service position, and means to move said valve device to lap position when the desired pressure is in the brake cylinder and while maintaining the said slide valve in service position.

8. A fluid pressure brake control valve comprising a slide valve chamber, a slide valve therein, an actuating piston connected to said slide valve, a brake pipe connection with the main slide valve chamber whereby brake pipe pressure will be applied to the valve chamber side of the actuating piston, means for applying a control reservoir pressure to the other side of said piston whereby a reduction of brake pipe pressure in the valve chamber will result in an inward movement of the actuating piston and the connected slide valve to application position, means for arresting the said slide valve in service position, a service braking pressure regulating valve device operating upon a reduction of brake pipe pressure to connect a service reservoir to the brake cylinder through the slide valve in the main slide valve chamber when the said slide valve is in service position, means to move said valve device to lap position when the desired pressure is in the brake cylinder and while maintaining the said slide valve in service position, and means whereby the said pressure regulating valve in its movement to service position will temporarily connect the brake pipe to the brake cylinder.

9. A fluid pressure brake control valve comprising a slide valve chamber, a slide valve therein, an actuating piston connected to said slide valve, a brake pipe connection with the main slide valve chamber whereby brake pipe pressure will be applied to the valve chamber side of the actuating piston, means for applying a control reservoir pressure to the other side of the said piston whereby a reduction of brake pipe pressure in the valve chamber will result in an inward movement of the actuating piston and the connected slide valve to application position, means for arresting the said slide valve in service position, a service braking pressure regulating valve device operating upon a reduction of brake pipe pressure to connect a service resorvoir to the brake cylinder, and means to move said valve device to lap position when the desired pressure is in the brake cylinder and while maintaining the said slide valve in service position.

10. A fluid pressure brake control valve comprising a service braking pressure regulating and maintaining valve operating upon a service reduction of brake pipe pressure to connect a service reservoir to the brake cylinder for a service application of the brakes, main and supplemental slide valves in a main slide valve chamber, the supplemental slide valve moving to service position upon a service reduction of brake pipe pressure said valve in service position co-operating with the pressure regulating valve to admit air to the brake cylinder for a service application of the brakes, the main and supplemental slide valves responding to an emergency reduction of brake pipe pressure to place an emergency reservoir, the service reservoir and the control reservoir is communication with the brake cylinder independently of the pressure regulating valve for an emergency application of the brakes.

11. A fluid pressure brake control valve comprising a service braking pressure regulating and maintaining valve subject to brake pipe, brake cylinder and emergency reservoir pressures and operating upon a reduction of brake pipe pressure to place a service reservoir in communication with the brake cylinder for a service application of the brakes, the brake cylinder pressure assisting the brake pipe pressure in moving the said pressure regulating valve to lap position, main and supplemental slide valves in a main slide valve chamber and subject to brake pipe pressure and control reservoir pressure, the supplemental slide valve moving to service position upon a service reduction of brake pipe pressure, said valve in service position co-operating with the pressure regulating valve to admit air to the brake cylinder for a service application of the brakes, the main and supplemental slide valves being operated by control reservoir pressure to emergency position upon an emergency reduction of brake pipe pressure the said main valve in emergency position connecting an emergency reservoir, the service reservoir and the control reservoir to the brake cylinder for an emergency application of the brakes.

12. A fluid pressure brake control valve in accordance with claim 11 and provided with means whereby the main slide valve and supplemental slide valve in full release position will connect the emergency reservoir to the brake pipe for a quick release of the brakes.

13. A fluid pressure brake control valve in accordance with claim 11 and provided with means whereby the main slide valve and the supplemental slide valve in full release position will connect the emergency reservoir to the main valve chamber and to the brake pipe for a quick release of the brakes.

14. A fluid pressure brake control valve in accordance with claim 11 and provided with means whereby the main slide valve and supplemental slide valve in full release position will connect the emergency reservoir to the brake pipe for a predetermined period for a quick release of the brakes.

15. A fluid pressure brake control valve in accordance with claim 11 and provided with a release governing valve having a graduated release position and a quick release position, said valve in its graduated release position rendering the main exhaust port of the main slide valve ineffective and preventing the flow of emergency reservoir air to the brake pipe whereby the release of brake cylinder pressure will be controlled by the pressure regulating valve, said release governing valve in its quick release position rendering the main slide valve effective in release operations and the supplemental slide valve in release position co-operating with the main slide valve to operate means to admit the emergency reservoir air into the brake pipe for a quick release of the brakes.

16. A fluid pressure brake control valve in accordance with claim 11 and provided with a release governing valve having a graduated release position and a quick release position, said valve in its graduated release position rendering the main exhaust port of the main slide valve ineffective and preventing the flow of emergency reservoir air to the brake pipe whereby the release of brake cylinder pressure will be controlled by the pressure regulating valve, said release governing valve in its quick release position rendering the main slide valve effective in release operations and the supplemental slide in release position co-operating with the main slide valve to operate means to admit the emergency reservoir air into the brake pipe for a predetermined period for a quick release of the brakes.

17. A fluid pressure brake control valve comprising a service braking pressure regulating and maintaining valve subject to brake pipe, brake cylinder and emergency reservoir pressures and operating upon a reduction of brake pipe pressure to place a service reservoir in communication with the brake cylinder for a service application of the brakes, the brake cylinder pressure assisting the brake pipe pressure in moving the said pressure regulating valve to lap position, main and supplemental slide valves in a main slide valve chamber and subject to brake pipe pressure and control reservoir pressure, a brake pipe connection to the main slide valve chamber, the supplemental slide valve moving to service position upon a service reduction of brake pipe pressure, in the main slide valve chamber, said valve in service position co-operating with the pressure regulating valve to admit air to the brake cylinder for a service application of the brakes, the main and supplemental slide valves being operated by control reservoir pressure to emergency position upon an emergency reduction of brake pipe pressure in the main slide valve chamber, the said main valve in emergency position connecting an emergency reservoir and a service reservoir and a control reservoir to the brake cylinder independently of the pressure regulating valve for an emergency application of the brakes.

18. A fluid pressure brake control valve operating upon a slow reduction of brake pipe pressure to admit service reservoir air to the brake cylinder for a service application of the brakes and operating upon a sudden reduction of brake pipe pressure to admit emergency reservoir air to the brake cylinder for an emergency application of the brakes and operating upon an increase in brake pipe pressure to connect the brake cylinder to atmosphere, and provided with a service braking pressure regulating and maintaining valve operating upon a slow reduction of brake pipe pressure to admit service reservoir air to the brake cylinder for a service application of the brakes said pressure regulating valve operating upon an increase in brake pipe pressure to connect the brake cylinder to atmosphere, a main slide valve having a normal release and service application position and an emergency position, a supplemental slide valve co-operating with the main slide valve and movable to service position upon a service reduction of brake pipe pressure said supplemental valve in service position co-operating with the pressure regulating valve to admit service reservoir air to the brake cylinder for a service application of the brakes, the main and supplemental slide valves operating upon an emergency reduction of brake pipe pressure to move to emergency position, the main slide valve in emergency position connecting the emergency reservoir the service reservoir and the control reservoir to the brake cylinder, means whereby the main slide valve will be automatically moved back to normal release and service application position after an emergency application, and means whereby the supplemental slide valve will be moved to release position upon an increase of brake pipe pressure.

19. A fluid pressure brake control valve in accordance with claim 18 and provided with an emergency reservoir valve, a quick release valve, means operating to open said emergency reservoir valve when the main slide valve is moved to emergency position to thereby permit the emergency reservoir air to flow to the brake cylinder, and means whereby the main slide valve in normal position and the supplemental slide valve in release position will operate means to open the quick release valve to permit emergency reservoir air to flow to the brake pipe for a quick release of the brakes.

20. A fluid pressure brake control valve in accordance with claim 18 and provided with a quick release valve, and means whereby the main slide valve in normal position and the supplemental slide valve in release position will operate means to open the quick release valve to permit emergency reservoir air to flow to the brake pipe for a predetermined period for a quick release of the brakes.

21. A fluid pressure brake control valve in accordance with claim 18 and provided with a brake pipe vent valve and with means whereby when the main slide valve is in emergency position the said vent valve will be opened and the brake pipe vented to atmosphere.

22. A fluid pressure brake control valve operating upon a slow reduction of brake pipe pressure to admit service reservoir air to the brake cylinder for a service application of the brakes and operating upon a sudden reduction of brake pipe pressure to admit emergency reservoir air to the brake cylinder for an emergency application of the brakes and operating upon an increase in brake pipe pressure to connect the brake cylinder to atmosphere, and provided with a service braking pressure regulating and maintaining valve operating upon a slow reduction of brake pipe pressure to admit service reservoir air to the brake cylinder for a service application of the brakes said pressure regulating valve operating upon an increase in brake pipe pressure to connect the brake cylinder to atmosphere, a main slide valve having a normal release and service application position and an emergency position, a supplemental slide valve co-operating with the main slide valve and movable to service position upon a service reduction of brake pipe pressure said supplemental valve in service position co-operating with the pressure regulating valve to admit service reservoir air to the brake cylinder for a service application of the brakes, the main and supplemental slide valves operating upon an emergency reduction of brake pipe pressure to move to emergency position, the main slide valve in emergency position connecting the emergency reservoir the service reservoir and the control reservoir to the brake cylinder, means whereby the main slide valve will be automatically moved back to normal release and service application position after an emergency application, means whereby the supplemental slide valve will be moved to release position upon an increase of brake pipe pressure, a brake pipe vent valve, means whereby when the main slide valve is in emergency position the said vent valve will be opened and the brake pipe vented to atmosphere, a brake pipe air admission valve, and means whereby when the main slide valve is in emergency position the said admission valve will be opened to permit brake pipe air to flow to the brake cylinder.

23. A fluid pressure brake control valve in accordance with claim 10, and provided with a brake pipe vent valve, means whereby when the main slide valve is in emergency position the said vent valve will be opened and the brake pipe vented to atmosphere, a brake pipe air admission valve, and means whereby when the main slide valve is in emergency position the said admission valve will be opened to permit brake pipe air to flow to the brake cylinder.

24. A fluid pressure brake control valve in accordance with claim 11 and provided with a brake pipe vent valve and with means whereby when the main slide valve is in emergency position, the said vent valve will be opened and the brake pipe vented to atmosphere.

25. A fluid pressure brake control valve comprising a main slide valve chamber, a main slide valve therein, a supplemental slide valve superposed on the main slide valve, a main actuating piston connected to the supplemental slide valve, a brake pipe connection with the main slide valve chamber whereby brake pipe pressure will be applied to the inner side of the main actuating piston, means for applying control reservoir pressure to the outer side of said piston whereby a reduction of brake pipe pressure in the main valve chamber will result in an inward movement of the actuating piston and the supplemental slide valve to application position, means for holding the main slide valve stationary during the service movement of the supplemental slide valve, a yieldable service stop carried by the supplemental slide valve to permit the said supplemental valve to have a slight excess movement beyond service position upon a quick service reduction of brake pipe pressure in the main valve chamber, and means whereby said slight excess movement of the supplemental valve beyond service position will permit control reservoir pressure to flow to the brake cylinder to thereby prevent the movement of the main slide valve to emergency position.

26. A fluid pressure brake control valve comprising a main slide valve chamber, a slide valve therein, a main actuating piston connected to said slide valve, a brake pipe connection with the main slide valve chamber whereby brake pipe pressure will be applied to the inner side of the main actuating piston, means for applying reservoir pressure to the outer side of said piston whereby a reduction of brake pipe pressure in the main valve chamber will result in an inward movement of the actuating piston and the slide valve to application position, a yieldable service stop carried by the slide valve to permit said valve to have a slight excess movement beyond service position upon a quick service reduction of brake pipe pressure in the main valve chamber, and means whereby said slight excess movement of the said valve beyond service position will permit the reservoir pressure from the outer side of the main actuating piston to flow to the brake cylinder to thereby prevent the movement of the slide valve to emergency position.

27. A fluid pressure brake control valve comprising a slide valve chamber, a slide valve therein, an actuating piston connected to said slide valve, a brake pipe connection with the main slide valve chamber whereby brake pipe pressure will be applied to the valve chamber side of the actuating piston, means for applying a control reservoir pressure to the other side of said piston whereby a reduction of brake pipe pressure in the valve chamber will result in an inward movement of the actuating piston and the connected slide valve to application position, means for arresting the said slide valve in service position, a service braking pressure regulating and maintaining valve device, means for moving the said pressure regulating valve to service position upon a reduction of brake pipe pressure, means whereby said pressure regulating valve will place a service reservoir and the control reservoir in communication with the brake cylinder, and means whereby the brake cylinder pressure will move the said pressure regulating valve to lap position when the desired pressure has been built up in the brake cylinder.

28. A fluid pressure brake control valve comprising a slide valve chamber, a slide valve therein, an actuating piston connected to said slide valve, a brake pipe connection with the main slide valve chamber whereby brake pipe pressure will be applied to the valve chamber side of the actuating piston, means for applying a control reservoir pressure to the other side of said piston whereby a reduction of brake pipe pressure in the valve chamber will result in an inward movement of the actuating piston and the connected slide valve to application position, means for arresting the said slide valve in service position, a service braking pressure regulating valve device operating upon a reduction of brake pipe pressure to connect a service reservoir to the brake cylinder, and means to move said valve device to lap position when the desired pressure is in the brake cylinder and while maintaining the said slide valve in service position.

29. A fluid pressure brake control valve comprising a slide valve chamber, a slide valve therein, an actuating piston connected to said slide valve, a brake pipe connection with the main slide valve chamber whereby brake pipe pressure will be applied to the valve chamber side of the actuating piston, means for applying a control reservoir pressure to the other side of said piston whereby a reduction of brake pipe pressure in the valve chamber will result in an inward movement of the actuating piston and the connected slide valve to application position, means for arresting the said slide valve in service position, a service braking pressure regulating valve device operating upon a reduction of brake pipe pressure to connect a service reservoir to the brake cylinder, means to move said valve device to lap position when the desired pressure is in the brake cylinder and while maintaining the said slide valve in service position, and means whereby the said pressure regulating valve in its movement to service position will temporarily connect the brake pipe to the brake cylinder.

30. A fluid pressure brake control valve comprising a slide valve chamber, a slide valve therein, an actuating piston connected to said slide valve, a brake pipe connection with the main slide valve chamber, whereby brake pipe pressure will be applied to the valve chamber side of the actuating piston, means for applying a control reservoir pressure to the other side of said piston whereby a reduction of brake pipe pressure in the valve chamber will result in an inward movement of the actuating piston and the connected slide valve to application position, means for arresting the said slide valve in service position, a service braking pressure regulating and maintaining valve device, means for moving the said pressure regulating valve to service position upon a reduction of brake pipe pressure, means whereby said pressure regulating valve will place a service reservoir and the control reservoir in communication with the brake cylinder, means whereby the brake cylinder pressure will move the said pressure regulating valve to lap position when the desired pressure has been built up in the brake cylinder, and means whereby the slide valve in service position will connect the service reservoir to the brake pipe.

31. A fluid pressure brake control valve comprising a slide valve chamber, a slide valve therein, an actuating piston connected to said slide valve, a brake pipe connection with the main slide valve chamber whereby brake pipe pressure will be applied to the valve chamber side of the actuating piston, means for applying a control reservoir pressure to the other side of said piston whereby a reduction of brake pipe pressure in the valve chamber will result in an inward movement of the actuating piston and the connected slide valve to application position, means for arresting the said slide valve in service position, a service braking pressure regulating and maintaining valve device, means for moving the said pressure regulating valve to service position upon a reduction of brake pipe pressure, means whereby said pressure regulating valve will place a service reservoir and the control reservoir in communication with the brake cylinder, means whereby the brake cylinder pressure will move the said pressure regulating valve to lap position when the desired pressure has been built up in the brake cylinder, and means whereby the said slide valve in service position will connect the service reservoir to the brake pipe.

32. A fluid pressure brake control valve comprising a slide valve chamber, a slide valve therein, an actuating piston connected to said slide valve, a brake pipe connection whereby brake pipe pressure will be applied to one side of the actuating piston, means for applying a control reservoir pressure to the other side of said piston whereby a reduction of brake pipe pressure will result in a movement of the actuating piston and the connected slide valve to application position, means for arresting the said slide valve in service position, a service braking pressure regulating and maintaining valve device, means for moving said pressure regulating valve to service position upon a reduction of brake pipe pressure, means whereby said pressure regulating valve in service position will place a service reservoir in communication with the brake cylinder through the slide valve in the slide valve chamber when said slide valve is in service position, means whereby said pressure regulating valve during its movement to service position will temporarily connect the brake pipe to the brake cylinder, and means whereby the brake cylinder pressure will move the said pressure regulating valve to lap position when the desired pressure has been built up in the brake cylinder.

33. A fluid pressure brake control valve comprising a slide valve chamber, a slide valve therein, an actuating piston connected to said slide valve, a brake pipe connection whereby brake pipe pressure will be applied to one side of the actuating piston, means for applying a control reservoir pressure to the other side of said piston whereby a reduction of brake pipe pressure will result in a movement of the actuating piston and the connected slide valve to application position, means for arresting the said slide valve in service position, a service braking pressure regulating and maintaining valve device, means for moving the said pressure regulating valve to service position upon a reduction of brake pipe pressure, means whereby said pressure regulating valve will place a service reservoir in communication with the brake cylinder through the slide valve in the slide valve chamber when said valve is in service position, means whereby the brake cylinder pressure will move the said pressure regulating valve to lap position when the desired pressure has been built up in the brake cylinder, and means whereby the slide valve in service position will connect the service reservoir to the brake pipe.

34. A fluid pressure brake control valve comprising a slide valve chamber, a slide valve therein, an actuating piston connected to said slide valve, a brake pipe connection whereby brake pipe pressure will be applied to one side of the actuating piston, means for applying a control reservoir pressure to the other side of said piston whereby a reduction of brake pipe pressure will result in a movement of the actuating piston and the connected slide valve to application position, means for arresting the said slide valve in service position, a service braking pressure regulating and maintaining valve device, means for moving the said pressure regulating valve to service position upon a reduction of brake pipe pressure, means whereby said pressure regulating valve will place a service reservoir in communication with the brake cylinder through the slide valve in the slide valve chamber when said valve is in service position, and means whereby the slide valve in service position will connect the service reservoir to the brake pipe.

35. A fluid pressure brake control valve in accordance with claim 10 and provided with a brake pipe air admission valve, and means whereby when the main slide valve is in emergency position the said admission valve will be opened to permit brake pipe air to flow to the brake cylinder.

36. A fluid pressure brake control valve comprising a service braking pressure regulating and maintaining valve operating upon a service reduction of brake pipe pressure to connect a source of braking pressure to the brake cylinder for a service application of the brakes, main and supplemental slide valves in a main slide valve chamber, the supplemental slide valve moving to service position upon a service reduction of brake pipe pressure said valve in service position co-operating with the pressure regulating valve to admit air to the brake cylinder for a service application of the brakes, the main and supplemental slide valves responding to an emergency reduction of brake pipe pressure to place an emergency reservoir in communication with the brake cylinder independently of the pressure regulating valve for an emergency application of the brakes, a brake pipe admission valve, and means whereby when the main slide valve is in emergency position the said admission valve will be open to permit brake pipe air to flow to the brake cylinder.

In testimony whereof we hereunto affix our signatures.

WILLIAM ASTLE.
EDWARD P. WILSON.
MAURICE E. HAMILTON.
SPENCER G. NEAL.